(12) United States Patent
Kazei et al.

(10) Patent No.: US 12,540,844 B2
(45) Date of Patent: Feb. 3, 2026

(54) FROZEN CHAMBER FOR DISTRIBUTED ACOUSTIC SENSING (DAS) CONFIGURATION TESTS AND DISPOSABLE DEPLOYMENT

(71) Applicant: ARAMCO SERVICES COMPANY, Houston, TX (US)

(72) Inventors: Vladimir Kazei, Houston, TX (US); Harold Merry, Houston, TX (US); Seth Busetti, Houston, TX (US); Ezzedeen Alfataierge, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 300 days.

(21) Appl. No.: 18/485,054

(22) Filed: Oct. 11, 2023

(65) Prior Publication Data
US 2025/0123137 A1 Apr. 17, 2025

(51) Int. Cl.
*G01H 9/00* (2006.01)
*E21B 47/07* (2012.01)
*G01V 1/22* (2006.01)

(52) U.S. Cl.
CPC ............ *G01H 9/004* (2013.01); *E21B 47/07* (2020.05); *G01V 1/226* (2013.01)

(58) Field of Classification Search
None
See application file for complete search history.

(56) References Cited

U.S. PATENT DOCUMENTS

2015/0346370 A1* 12/2015 Martin ............... G01N 29/2418
  73/152.58
2017/0167249 A1* 6/2017 Lee .................... E21B 49/00
(Continued)

FOREIGN PATENT DOCUMENTS

CN 104583730 A 4/2015
CN 107894213 A 4/2018
(Continued)

OTHER PUBLICATIONS

International Search Report issued for corresponding international patent application No. PCT/US2024/050334, mailed Dec. 23, 2024 (5 pages).
(Continued)

*Primary Examiner* — Eric S. McCall
*Assistant Examiner* — Nigel H Plumb
(74) *Attorney, Agent, or Firm* — Osha Bergman Watanabe & Burton LLP

(57) ABSTRACT

A method includes providing a distributed acoustic sensing (DAS) system and a fiber sample. The DAS system includes a chamber and a signal generator positioned proximate to and outside the chamber. The method further includes manipulating the fiber sample into a desired shape, filling the chamber with a freezable liquid, wherein the freezable liquid is provided at room temperature, and placing the fiber sample into the chamber. The method also includes recording a first set of room temperature baseline measurements, freezing the freezable liquid, and recording a first set of frozen baseline measurements. The method further includes performing strain-sensing measurements while the signal generator is active, and melting the freezable liquid.

20 Claims, 3 Drawing Sheets

(56) References Cited

U.S. PATENT DOCUMENTS

| | | | |
|---|---|---|---|
| 2018/0180451 A1* | 6/2018 | Wissem | G01D 5/35387 |
| 2022/0412821 A1* | 12/2022 | Jaaskelainen | G01M 5/0091 |

FOREIGN PATENT DOCUMENTS

| | | |
|---|---|---|
| EP | 1871990 A1 | 1/2008 |
| WO | 2018075075 A1 | 4/2018 |

OTHER PUBLICATIONS

Written Opinion issued for corresponding international patent application No. PCT/US2024/050334, mailed Dec. 23, 2024 (8 pages).

Bakku, S.K. et al., "Vertical Seismic Profiling Using Distributed Acoustic Sensing in a Hydrofrac Treatment Well," Society of Exploration Geophysicists, pp. 5024-5028, 2014 (5 pages).

Daley, T.M. et al., "Field testing of fiber-optic distributed acoustic sensing (DAS) for subsurface seismic monitoring," The Leading Edge, No. 32, pp. 699-706, Jun. 2013 (7 pages).

Kasahara, J. et al., "Seismic Feasibility Study to Identify and Characterize Supercritical Geothermal Reservoirs Using DTS, DAS, and Surface Seismic Array," Proceedings World Geothermal Congress 2020+1, Oct. 2021 (9 pages).

Martuganova, E. et al., "Cable reverberations during wireline distributed acoustic sensing measurements: their nature and methods for elimination," Geophysical Prospecting, No. 69, pp. 1034-1054, 2021 (21 pages).

Merry, H. et al., "Optimizing Distributed Acoustic Sensing (DAS) Acquisition: Test Well Design and Automated Data Analysis," Society of Exploration Geophysicists, SEG International Exposition and 90th Annual Meeting, pp. 520-524, 2020 (5 pages).

Fernandez-Ruiz, M.R. et al., "Distributed Acoustic Sensing Using Chirped-Pulse Phase-Sensitive OTDR Technology," Sensors, 19, 4368, 2019 (28 pages).

Sanni, M. et al., "Lessons Learned from In-Well Fiber-Optic DAS/DTS Deployment," SPE-191470-MS, Society of Petroleum Engineers, Sep. 26, 2018 (12 pages).

Titov, A. et al., "Quantification of DAS VSP Quality: SNR vs. Log-Based Metrics," Sensors, 22, 1027, Jan. 28, 2022 (13 pages).

Willis, M.E. et al., "Quantitative quality of distributed acoustic sensing vertical seismic profile data," CrossMark, pp. 605-609, Jul. 2016 (5 pages).

Titov, A., et al., "Observations and modeling of scattered waves from hydraulic fractures in a DAS VSP experiment in the Permian Basin," SEG International Exposition and Annual Meeting, 2019 (5 pages).

Willis, M. E., et al., "Understanding cable coupling artifacts in wireline-deployed DAS VSP data," SEG International Exposition and Annual Meeting, 2019 (5 pages).

Byerley, G., et al., "Time-lapse seismic monitoring of individual hydraulic frac stages using a downhole DAS array," The Leading Edge, 2018 (9 pages).

Correa, J., et.al., "Analysis of signal to noise and directivity characteristics of DAS VSP at near and far offsets—A CO2CRC Otway Project data example," The Leading Edge, 2017 (7 pages).

Athur Hartog, "An Introduction to Distributed Optical Fibre Sensors," CRC Press, 2017 (96 pages).

Mateeva, A., et al., "Distributed acoustic sensing for reservoir monitoring with VSP," The Leading Edge, 2013 (5 pages).

Pevzner, R., B., et al., "Repeat well logging using earthquake wave amplitudes measured by distributed acoustic sensors," The Leading Edge, 2020 (23 pages).

* cited by examiner

FROZEN CHAMBER FOR DISTRIBUTED ACOUSTIC SENSING (DAS) CONFIGURATION TESTS AND DISPOSABLE DEPLOYMENT

BACKGROUND

Vertical seismic profiling (VSP) utilizes sensors installed within a wellbore and sources located at the surface of the well to allow for use of reflected and direct seismic wave properties for elastic property inversion. Conventionally, hydrophones, geophones, and accelerometers have been uses as wellbore sensors. Conventional deployment techniques have a number of limitations, including limited sensing aperture, costly rig time, and sensitivity to harsh environments.

Distributed acoustic sensing (DAS) uses telecommunication or engineered optical fibers as a dense array of single component strain or strain-rate sensors. DAS was introduced to VSP processes to deliver seismic wavefield recordings along the entire well length. Moreover, a fiber cable cemented behind the casing in a well allows for the recording of VSP during in-well operations. DAS VSP applications include offshore and onshore reservoir monitoring, hydraulic fracture monitoring, monitoring for carbon capture utilization, storage applications, and evaluation of geothermal sites.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method. The method may include providing a distributed acoustic sensing (DAS) system and a fiber sample, where the DAS system includes a chamber and a signal generator positioned proximate to and outside the chamber. The method may further include manipulating the fiber sample into a desired shape, filling the chamber with a freezable liquid, wherein the freezable liquid is provided at room temperature, and placing the fiber sample into the chamber. The method may also include recording a first set of room temperature baseline measurements, freezing the freezable liquid, and recording a first set of frozen baseline measurements. The method may further include performing strain-sensing measurements while the signal generator is active, and melting the freezable liquid.

In another aspect, embodiments disclosed herein relate to a frozen distributed acoustic sensing (DAS) system. The frozen DAS system may include a chamber and a freezable liquid disposed within the chamber. The frozen DAS system may further include a signal generator positioned proximate to and outside the chamber, and a fiber sample configured to be manipulated into one or more desired shapes.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
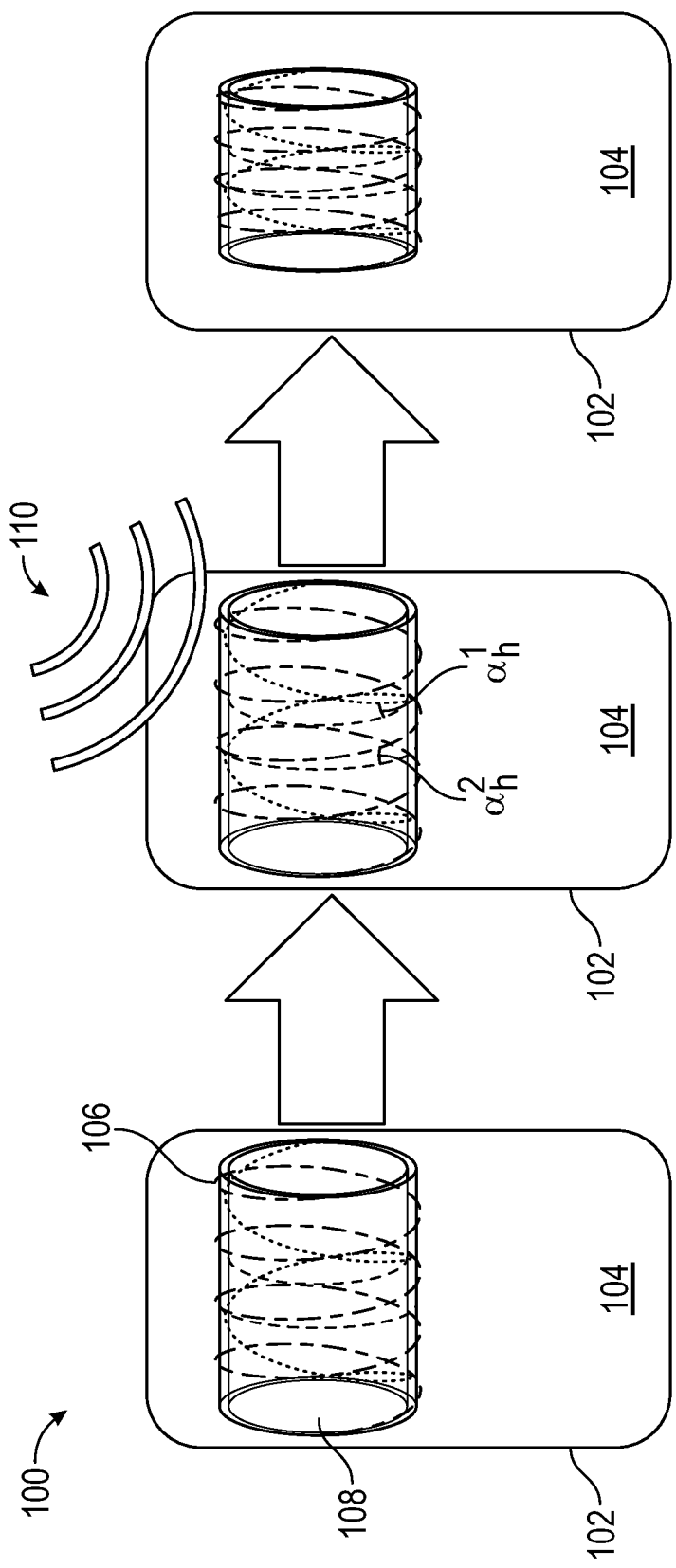
FIG. 1A-1C show a schematic of a workflow in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-3, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a frozen distributed acoustic sensing (DAS) system configured to perform strain measurements on a fiber sample. In another aspect, embodiments disclosed herein relate to a method of performing DAS testing on a fiber sample in a desired configuration.

In one or more embodiments, DAS may be implemented in a test well. The test well may be, for example, a vertical well cased with a combination of steel and fiberglass casing. In one or more embodiments, optical fibers in various protective encapsulations, including fiber in stainless steel tubing, armored wireline, and ruggedized cable jacketing are cemented behind the casings. A capillary u-tube my be installed being the casing, providing a method for installing and retrieving various fibers, a technique commonly utilized to replace failed fibers in high-temperature distributed temperature sensing (DTS) steam monitoring applications.

Coupling of fibers to a casing or pipe may play a crucial role in the quality of DAS data. Borehole fluid may generate tube waves, resulting in a significant reduction in coupling inside the borehole. As a result, DAS signal quality may deteriorate.

FIGS. 1A-1C show a schematic of a workflow in accordance with one or more embodiments. More specifically, FIG. 1A-1C show a schematic of a workflow for using a frozen DAS system 100 to test fiber deployment configurations for optimization of DAS signal quality. Further, FIG. 1A shows a first stage of the workflow, FIG. 1B shows a second stage of the workflow, and FIG. 1C shows a third stage of the workflow.

DAS configuration tests may be performed in a chamber 102. In one or more embodiments, the chamber 102 may be any container which may be safely frozen. For example, the chamber 102 may be a cylindrical pipe, a wellbore, an excavated borehole, or a rectangular box. The chamber 102 may be filled with a freezable liquid 104. In one or more embodiments, the freezable liquid 104 may be water. In other embodiments, the freezable liquid 104 may be drilling mud or borehole fluid.

A fiber 106 may be provided in the chamber 102 for DAS testing. In one or more embodiments, the fiber 106 may be manipulated into a desired shape using a mould 108. In one or more embodiments, the fiber 106 may be wrapped tightly around the mould 108. The mould 108 may be, for example, a wire framework or a cylindrical liner. In other embodiments, the fiber 106 may be covered in a bendable, shape-preserving coating such that the fiber 106 may be manipulated into a desired shape and may remain freestanding. The bendable shape-preserving coating may be copper or aluminum, for example. In one or more embodiments, a second fiber may be manipulated into the desired shape in conjunction with the fiber 106. The desired shape may be, for example, a contrahelical configuration. The fiber 106 may be placed into the chamber 102. Baseline measurements may be recorded when the freezable liquid 104 is at room temperature.

In one or more embodiments, in the second stage of the freezable liquid 104 may then be frozen, as shown in FIG. 1B. Freezing of the freezable liquid 104 may be accomplished via a number of different methods. For example, in one or more embodiments, the frozen DAS system 100 may be frozen in its entirety by placing the entire system 100 into an industrial cooler. The industrial cooler may be an industrial cooler used for refrigerated storage of rock core or frozen foods, for example. Bulk refrigeration, as offered by freezing of the entire system 100, may positively impact lab tests and calibration of acoustic measurements recorded by the fiber 106 with strain meters, geophones, seismometers, accelerometers, or other elastic-field-sensing devices. The fiber 106 may be used as a temperature gauge or an additional fiber may be frozen together with the fiber 106 for temperature monitoring.

Figure 2:
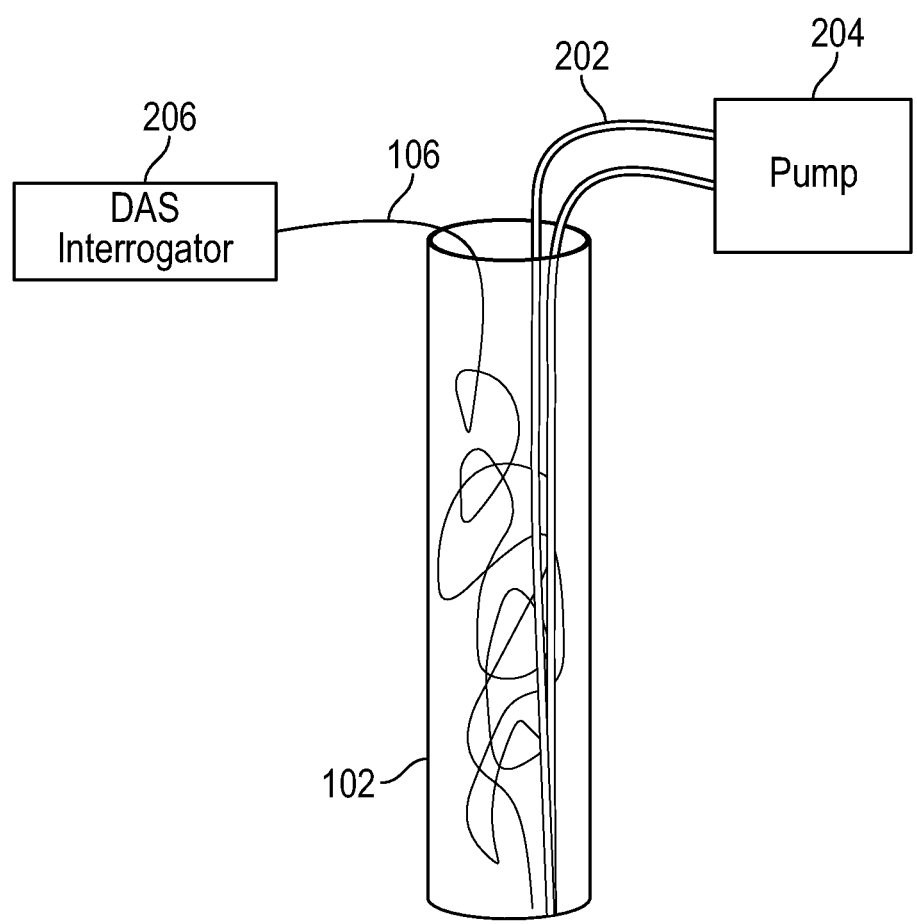
FIG. 2 shows a schematic of a testing apparatus in accordance with one or more embodiments.

Alternatively, the freezable liquid 104 may be frozen via a tube provided in the chamber 102. An example of such a system is shown in FIG. 2. In this example, the chamber 102 may be a borehole or a cylindrical pipe. In one or more embodiments, the tube 202 may be configured to supply a cold fluid to and through the chamber 102, lowering the temperature of the freezable liquid 104 below freezing. The cold fluid may be, for example, liquid nitrogen or conventional refrigerating freon. A pump 204 may be used to supply and propel the cold fluid through the chamber 102. A DAS interrogator 206 may be connected to the fiber 106 and may be configured to perform and record measurements. Baseline measurements may be recorded under frozen conditions. In one or more embodiments, the fiber 106 may undergo contraction as a result of cooling of the fiber 106 and contact pressure from the expanding freezable liquid 104, such as ice.

Turning back to FIG. 1B, strain-sensing measurements of interest may be performed and recorded with the frozen DAS system 100. A signal generator 110 may be used to create acoustic perturbations for DAS testing. In one or more embodiments, the signal generator 110 may be a seismic vibrator, an ultrasonic transducer, or a low-frequency source of quasi-static perturbations. DAS is sensitive to a wide spectrum of acoustic frequencies. As such, an arbitrary source may be useful.

Once the strain-sensing measurements of interest have been recorded, the workflow may progress into its third stage, as shown in FIG. 1C. The freezable liquid 104 may be melted and the fiber 106 may be removed from the chamber 102. The freezable liquid 104 may be melted by placing the frozen DAS system 100 in a warm location or positioning a heater proximate the chamber 102. Alternatively, a hot fluid may be directed through a tube, such as tube 202 shown in FIG. 2, which may be disposed within the chamber. Once the fiber 106 has been removed from the chamber 102, the fiber 106 may be reconfigured into a new desired shape. The workflow may then be repeated for each desired shape of interest.

Figure 3:
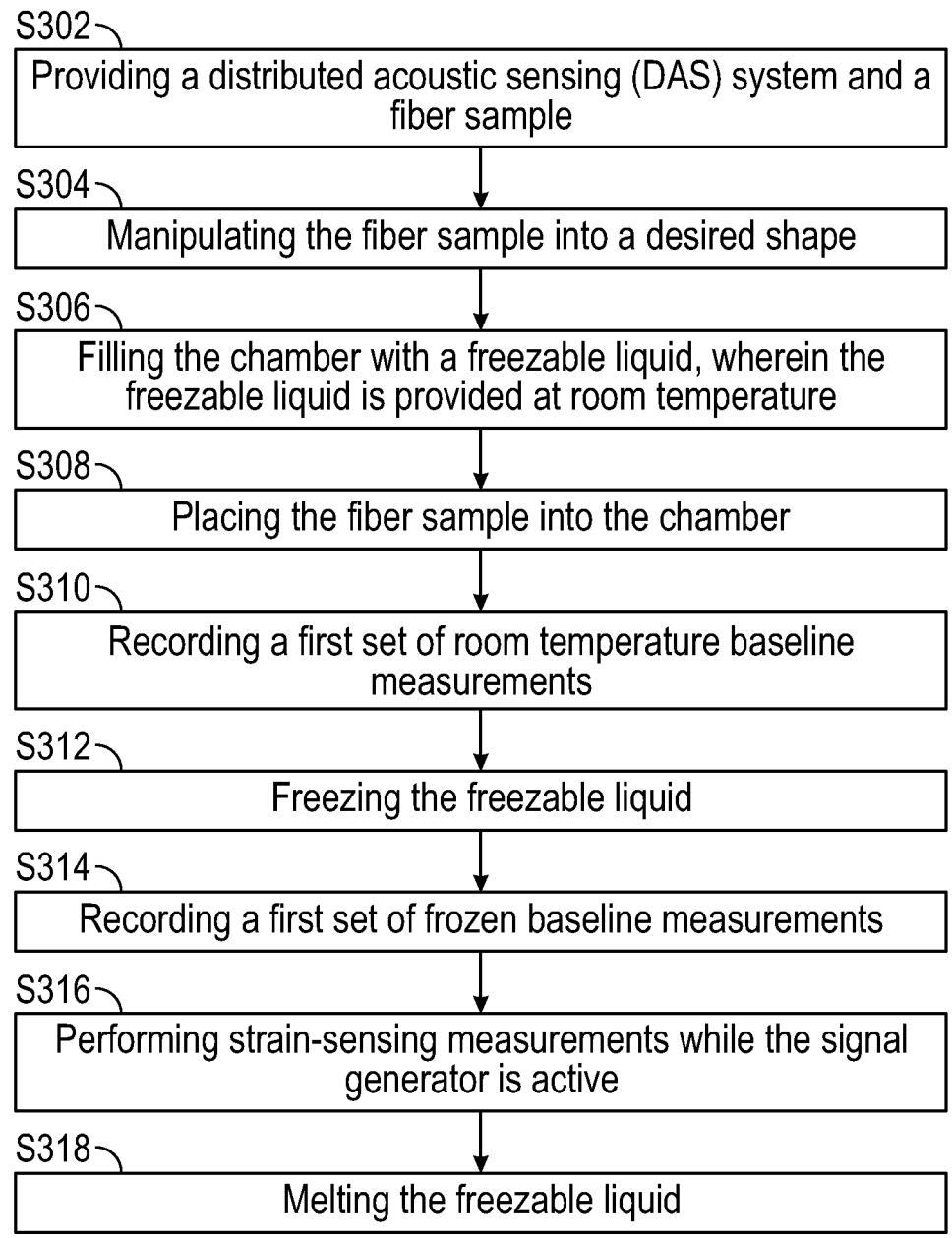
FIG. 3 shows a flowchart of a method in accordance with one or more embodiments.

FIG. 3 depicts a flowchart in accordance with one or more embodiments. More specifically, FIG. 3 depicts a flowchart 300 of a method of performing frozen DAS testing on a fiber sample. Further, one or more blocks in FIG. 3 may be performed by one or more components as described in FIGS. 1-3. While the various blocks in FIG. 3 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a distributed acoustic sensing (DAS) system 100 and a fiber sample 106 may be provided, S302. In one or more embodiments, the DAS system 100 may include a chamber 102 and a signal generator 110 positioned proximate to and outside the chamber 102. The fiber sample 106 may be manipulated into a desired shape, S304. In one or more embodiments, the desired shape may be a contrahelical configuration. In other embodiments, the desired shape may be a sinusoidal configuration. Further, without departing from the scope of this disclosure, the desired shape may be any arbitrarily shaped configuration. Manipulating the fiber sample 106 into a desired shape, in accordance with one or more embodiments, may include wrapping the fiber sample 106 around a mould 108. The mould 108 may be a wire framework or a cylindrical liner. In other embodiments, manipulating the fiber sample 106 into a desired shape may include covering the fiber sample 106 with a bendable, shape-preserving material and forming the fiber sample 106 into the desired shape.

The chamber 102 may be filled with a freezable liquid 104, wherein the freezable liquid 104 is provided at room temperature, S306. In one or more embodiments, the freezable liquid 104 may be water. In other embodiments, the freezable liquid 104 may be drilling mud or borehole fluid. The fiber sample 106 may be placed into the chamber 102 and may be submerged in the freezable liquid 104, S308. A first set of room temperature baseline measurements may be recorded, S310.

The freezable liquid 104 may then be frozen, S312. In one or more embodiments, freezing the freezable liquid 104 may include placing the DAS system 100 into an industrial cooler and monitoring a temperature of the fiber sample 106. In some embodiments, the fiber sample 106 itself may be used as a temperature gauge for monitoring the temperature of the fiber sample 106. In other embodiments, an additional fiber may be frozen with the fiber sample 106, where the additional fiber is solely used for temperature monitoring. A first set of frozen baseline measurements may be recorded, S314.

Once baseline measurements are established, both when the freezable liquid 104 is at room temperature and frozen, strain-sensing measurements may be performed while the signal generator 110 is active, S316. In one or more embodiments, the signal generator 110 may be a seismic vibrator, an ultrasonic transducer, or a low-frequency source of quasi-static perturbations. The strain sensing measurements may be primarily performed to collect information about the elastic properties of the surrounding subsurface (i.e., VSP).

Once all desired measurements have been recorded, the freezable liquid 104 may be melted, S318. In one or more embodiments, melting the freezable liquid 104 may include placing the entire DAS system 100 in a warmer environment or positioning a heater proximate to and outside the chamber 102. In other embodiments, hot fluid may be supplied to and circulated through the chamber 102 by a tube 202, where fluid is propelled through the tube 202 by a pump 204.

Once the freezable liquid 104 has been melted, the fiber sample 106 may be removed from the chamber 102 and may be reconfigured into a second desired shape. Once the fiber sample 106 is arranged into the second desired shape, steps S308 to S318 may be repeated. For example, a second set of room temperature baseline measurements and a second set of frozen baseline measurements may be recorded once the fiber sample 106, configured in the second desired shape, is placed into the chamber 102. Further, steps S308 to S318 may be repeated for each desired fiber configuration.

Ice and cement have relatively similar elastic properties. As such, testing of fiber configurations in a frozen environment, such as the frozen freezable liquid 104, may produce substantially similar results to that which would be produced after actual cementation of the fiber 106. As a result, determination of a fiber configuration which allows for optimized DAS data quality in the frozen DAS system 100 testing indicates that such a configuration would also be effective in the field.

Embodiments of the present disclosure may provide at least one of the following advantages. Methods and systems described herein improve and optimize coupling of a fiber to a surrounding subsurface for improvement of DAS data quality. In one aspect, freezing the liquid in the chamber inherently improves coupling of the fiber to the surround subsurface. Further, testing fiber configurations allows for selection of a fiber shape which optimizes coupling of the fiber to the surrounding subsurface, which, in turn, allows for optimization of DAS data quality. The strain field is reduced to pressure or P-waves in liquids surround dispensable fiber installations, which limits possible measurements with the fiber. Ice, however, is a solid with P-wave velocity of 3400-3600 m/s and S-wave speeds typically in a range of 1700-1900 m/s. These properties are substantially similar to the properties of cement, which is typically used for behind the casing fiber cementation. If the contrast between the media that the fiber is placed into and the surrounding media is high, energy may be reflected, leading to low quality measurements. Further, when the fiber is placed in water, it may not be practically usable since the shear modulus of water is zero and stretching of the fiber along its direction does not occur. As such, freezing of the surrounding media is preferable, both in testing scenarios and field implementations, in producing conditions which yield high quality measurements.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:
providing a distributed acoustic sensing (DAS) system and a fiber sample,
wherein the DAS system comprises:
a chamber, and
a signal generator positioned proximate to and outside the chamber;
manipulating the fiber sample into a desired shape;
filling the chamber with a freezable liquid, wherein the freezable liquid is provided at room temperature;
placing the fiber sample into the chamber;
recording a first set of room temperature baseline measurements;
freezing the freezable liquid;
recording a first set of frozen baseline measurements;
performing strain-sensing measurements while the signal generator is active; and
melting the freezable liquid.

2. The method of claim 1 further comprising:
removing the fiber sample from the chamber;
manipulating the fiber sample into a second desired shape;
placing the fiber sample into the chamber;
recording a second set of room temperature baseline measurements;
freezing the freezable liquid;
recording a second set of frozen baseline measurements;
performing strain-sensing measurements while the signal generator is active; and
melting the freezable liquid.

3. The method of claim 1, wherein manipulating the fiber sample into a desired shape comprises wrapping the fiber sample around a mould.

4. The method of claim 3, wherein the mould comprises a wire framework or a cylindrical liner.

5. The method of claim 1, wherein manipulating the fiber sample into a desired shape comprises covering the fiber sample with a bendable, shape-preserving material and forming the fiber sample into the desired shape.

6. The method of claim 1, wherein the chamber is selected from a group consisting of a cylindrical pipe, a wellbore, an excavated borehole, and a rectangular box.

7. The method of claim 1, wherein freezing the freezable liquid comprises placing the DAS system into an industrial cooler and monitoring a temperature of the fiber sample.

8. The method of claim 1, wherein freezing the freezable liquid comprises providing a tube in the chamber, wherein the tube is configured to supply and circulate liquid nitrogen or refrigerating freon to and through the chamber.

9. The method of claim 1, wherein the signal generator is selected from a group consisting of a seismic vibrator, an ultrasonic transducer, or a low-frequency source of quasi-static perturbations.

10. The method of claim 1, wherein melting the freezable liquid comprises positioning the DAS system in a warm location or positioning a heater proximate to the chamber.

11. The method of claim 1, wherein melting the freezable liquid comprises providing a tube in the chamber, wherein the tube is configured to supply and circulate hot liquids to and through the chamber.

12. A frozen distributed acoustic sensing (DAS) system comprising:
   a chamber;
   a freezable liquid disposed within the chamber;
   a signal generator positioned proximate to and outside the chamber; and
   a fiber sample configured to be manipulated into one or more desired shapes.

13. The frozen DAS system of claim 12, wherein the chamber is selected from a group consisting of a cylindrical pipe, a wellbore, an excavated borehole, and a rectangular box.

14. The frozen DAS system of claim 12, wherein the signal generator is selected from a group consisting of a seismic vibrator, an ultrasonic transducer, or a low-frequency source of quasi-static perturbations.

15. The frozen DAS system of claim 12, wherein the fiber sample is configured to be wrapped around a mould to form the one or more desired shapes.

16. The frozen DAS system of claim 15, wherein the mould comprises a wire framework or a cylindrical liner.

17. The frozen DAS system of claim 12, wherein the fiber sample further comprises a bendable, shape-preserving coating.

18. The frozen DAS system of claim 12, wherein the freezable liquid comprises water.

19. The frozen DAS system of claim 12, further comprising a tube disposed within the chamber, wherein the tube is provided to supply a hot liquid or a cold liquid to and through the chamber.

20. The frozen DAS system of claim 19, further comprising a pump configured to propel the hot liquid or the cold liquid through the tube.

* * * * *